June 5, 1928.
J. B. WEST
1,672,400
YIELDING MOTION TRANSMITTING DEVICE
Filed May 9, 1924
2 Sheets-Sheet 1
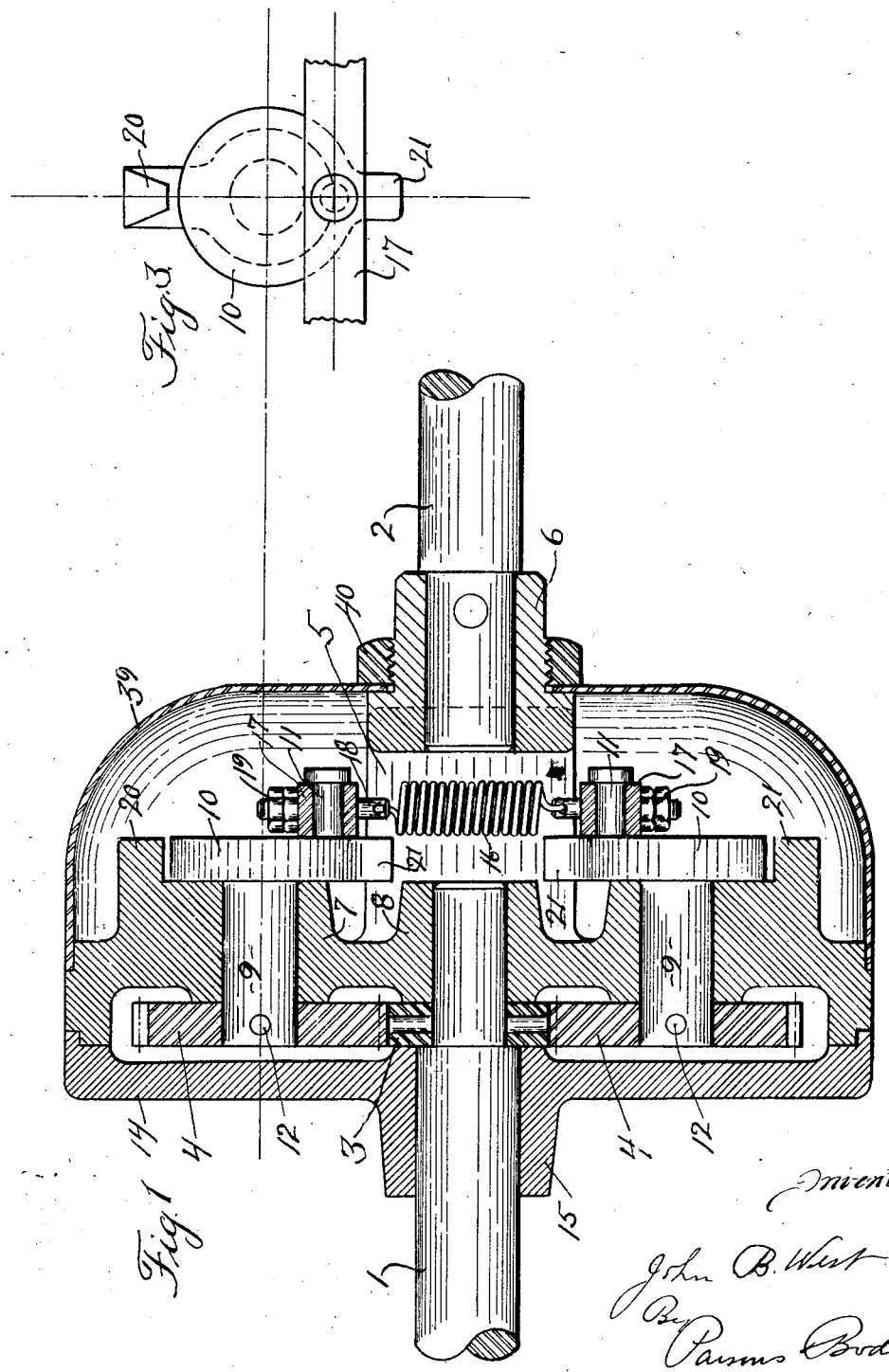

June 5, 1928.  1,672,400
J. B. WEST
YIELDING MOTION TRANSMITTING DEVICE
Filed May 9, 1924   2 Sheets-Sheet 2
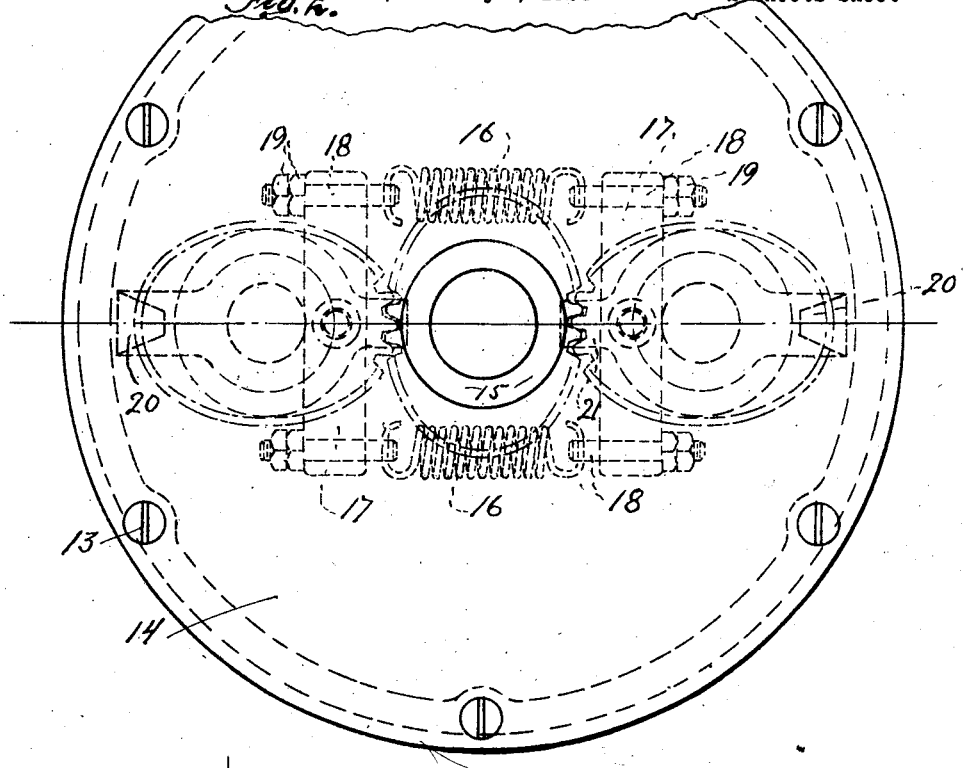
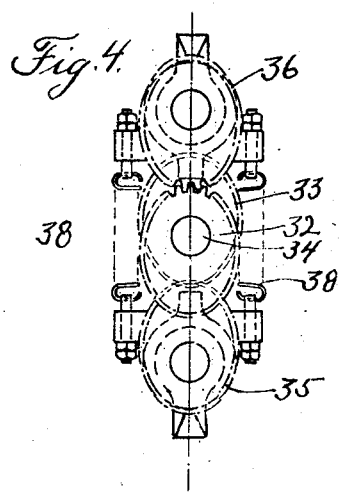
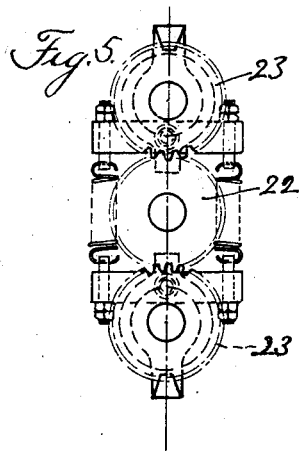
INVENTOR.
John B. West
BY
ATTORNEY.

Patented June 5, 1928.

1,672,400

UNITED STATES PATENT OFFICE.

JOHN B. WEST, OF SYRACUSE, NEW YORK.

YIELDING MOTION-TRANSMITTING DEVICE.

Application filed May 9, 1924. Serial No. 712,039.

This invention relates to flexible motion transmitting mechanism, or torque cushioning mechanism, and has for its object a particularly simple, compact, efficient, and strong motion transmitting mechanism, particularly adaptable for use in motor vehicles for cushioning or flexibly transmitting the torque upon sudden acceleration of the power, quick letting in of the main clutch, or at any time when the power applied is greater than can be received by the driven element, it being understood that under certain conditions the driven or propeller shaft acts as a driver to the driven shaft, at which time this torque cushioning device or flexible motion transmitting mechanism acts also to cushion the torque as well as when any shaft receiving power from the engine is being actuated faster than the driven shaft can receive the power at that particular moment.

The invention consists in the novel features and in the combinations and constructions hereinafter set forth and claimed.

In describing this invention reference is had to the accompanying drawings in which like characters designate corresponding parts in all the views.

Figure 1 is a vertical sectional view of one embodiment of this flexible motion transmitting mechanism.

Figure 2 is an elevation looking to the right in Fig. 1.

Figure 3 is a fragmentary detail view of parts seen in Fig. 1, looking to the left in Fig. 1.

Figures 4 and 5 are diagrammatic views of other forms of this device.

This flexible transmitting mechanism or torque cushioner comprises driving and driven elements, a gear mounted on and rotatable with one of said elements, a planetary gear, carried by the other element and meshing with the former gear, and means for resisting relative rotation of the gears. Preferably the gears are arranged to increase the ratio upon relative turning of the gears from normal, in order to build up or rapidly increase the resistance of said means at a uniformly accelerated or increased ratio upon the relative turning of the gears.

As here shown the driving and driven elements are shafts 1 and 2, arranged in axial alinement. The driving shaft preferably having a center gear 3 mounted thereon to turn therewith and the driven shaft having planetary gears 4 associated and revolvable therewith, and meshing with the gear 3, there being preferably two gears 4, which are arranged on opposite sides of the gear 3, and mesh with diametrically opposite portions of the gear 3.

Preferably the gears 3 and 4, are elliptical gears, and the gears 3 and 4 are so arranged that normally the minor radius of the center gear 3 is substantially in line with the major radius of the planetary gears 4, to that, normally the ratio is lowest between the gears 3 and 4, as for instance, 1 to 2 and builds up during relative turning of the gears to 2 to 1.

The driven element, as here shown is provided with a yoke 5 having a hub 6 keyed or otherwise secured to the shaft 2 and this yoke supports a gear carrier 7 having a hub 8 on the shaft 1 or a reduced portion thereof, this hub 8 being arranged adjacent to the gear 3.

The planetary gears 4 are provided with axles 9 journalled in the carrier 7, and having disks 10 at their ends opposite to that on which the gears 4 are mounted, these disks 10 having eccentric pins 11.

The gears 4 are keyed, as at 12, to like ends of the axle 9, and the disks 10 are keyed to the other ends of the axle 9, or formed integral therewith, and these gears 4 and disks 10 are arranged contiguous to opposite faces of the carrier 7. The gears 4 thus have eccentric pins associated therewith although these eccentric pins are carried by disks rotatable with the gears 4.

Suitably secured to the carrier 7 as by screws 13 is a cover plate 14, having a hub 15 on the driving shaft 1, the inner end of the hub being adjacent to the gear 3.

The means for resisting relative rotation of the gears 3 and 4, is here shown as spring means connected to and preferably this spring means is connected at one end to one gear 4 and at its other end to the opposite gear 4, they being connected to the eccentric pins 11. Usually in order to provide sufficient spring within the limited space, a plurality of springs as 16 are used, which springs are connected to levers 17, pivoted between their ends on the eccentric pins 11, the springs being connected to opposite arms of these levers. As here shown the springs are connected to pins 18, extending through the ends of the levers 17 and adjustable endwisely as by means of nuts 19, the pins being adjustable for the purpose of regulating the initial tension of the spring.

Also if desired means may be provided for limiting the relative rotation of the gears 3 and 4, the means here shown being stops 20, provided on the carrier 7 and arranged in the path of peripheral shoulders 21 on the disks 10, the shoulders 21 and stops 20 being relatively arranged to limit the relative rotation of the gear when the springs are tensioned to their maximum extent. The stopping means may, however be omitted so that the gear after making a half revolution against the tension of the springs may complete the revolution and return to its starting position for the next operation, it being understood that only at rare intervals would the load be sufficient to entirely overcome the maximum tension of the springs.

Obviously during the relative rotation of the gears 3 and 4 owing to the relative arrangement of the major diameters of the planetary gear and the minor diameter of the central gear, the ratio between the central gear and the planetary gears will gradually increase and hence the tension of the spring increases at a uniformly increasing ratio.

As is shown in Fig. 5, the gears 22, 23 may be circular gears in which case the tension would be built up uniformly and not at an increasing ratio.

As seen in Fig. 4, eccentric gears and preferably eccentric elliptical gears are used, two central elliptical gears 32, 33 being mounted side by side in the driving shafts 34, and the planetary gears 35, 36 on the driven element meshing respectively with the gears 32, 33. Owing to the eccentricity of the two eccentric elliptical gears 32, 33 the tension of the spring 38 is rapidly built up or increased.

Preferably the mechanism is covered by a suitable cap 39 fitting over the carrier 7, and having an opening for receiving the hub 6 of the yoke 5, and being held on this hub by a nut 40 threading on the hub 6.

This motion transmitting device is particularly advantageous in that it has a range of movement of at least 180 degrees, and further in that owing to the elliptical gears the resistance is built up at a uniformly accelerated increased ratio. Also if the stops are omitted this mechanism will have a range of 180 degrees and repeat. However, as except under abnormal conditions a range of over 180 degrees would be of little value.

What I claim is:

1. In a flexible power transmitting mechanism, the combination of driving and driven elements, a gear mounted on one element, a plurality of planetary gears carried by the other element, and meshing with the former gear on opposite sides thereof, the planetary gears having crank pins associated therewith, the crank pins being arranged opposite to each other, and spring means connecting the crank pins.

2. In a flexible power transmitting mechanism, the combination of driving and driven elements, a gear mounted on one element, a plurality of planetary gears carried by the other element, and meshing with the former gear on opposite sides thereof, the planetary gears having crank pins associated therewith, levers pivotally mounted between their ends on the crank pins, and springs connecting the levers.

3. In a flexible power transmitting mechanism, the combination of driving and driven elements, a gear mounted on one element, a plurality of planetary gears carried by the other element, and meshing with the former gear on opposite sides thereof, the planetary gears having crank pins associated therewith, the crank pins being arranged opposite to each other, spring means connecting the crank pins, and means for limiting the relative rotation of said gears.

4. In a flexible power transmitting mechanism, the combination of driving and driven elements, intermeshing gears mounted on said elements, the gears on one of said elements being planetary gears, and said gears being arranged to increase the ratio between the same during relative rotation of said gears from their normal position, and means for resisting relative rotation of the gears.

5. In a flexible power transmitting mechanism, the combination of driving and driven elements, intermeshing gears mounted on said elements, the gears on one of said elements being planetary gears, and said gears being arranged to increase the ratio between the same during relative rotation of said gears from their normal position, and spring means connecting the planetary gears.

6. In a flexible power transmitting mechanism, the combination of driving and driven elements, intermeshing gears mounted on said elements, the gears on one of said elements being planetary gears, and said gears being arranged to increase the ratio between the same during relative rotation of said gears from their normal position, the planetary gears having eccentric pins associated therewith, and spring means connecting the eccentric pins.

7. In a flexible power transmitting mechanism, the combination of driving and driven elements, and an elliptical gear mounted on the driving element, a planetary elliptical gear carried by the driven element, and arranged to mesh with the former elliptical gear, and means for resisting relative rotation of the gears.

8. In a flexible power transmitting mechanism, the combination of driving and driven elements, an elliptical gear mounted on one element, a pair of planetary gears carried by the other element, on opposite sides of the former gear, the planetary gears being elliptical and arranged to mesh with the former gears, and said gears being normally arranged so that the major and minor diameters of the intermeshing gears are in alinement, and means connected to the planetary gears for resisting relative rotation of the gears.

9. In a flexible power transmitting mechanism, the combination of driving and driven elements, an elliptical gear mounted on one element, a pair of planetary gears carried by the other element, on opposite sides of the former gear, the planetary gears being elliptical and arranged to mesh with the former gear, and said gears being normally arranged so that the major and minor diameters of the intermeshing gears are in alinement, and means connecting the planetary gears for resisting relative rotation thereof.

10. In a flexible power transmitting mechanism, the combination of driving and driven elements, a gear mounted on one element, a plurality of planetary gears carried by the other element, and meshing with the former gear on opposite sides thereof, the planetary gears having crank pins associated therewith, and spring means connecting the crank pins of the gears and arranged to resist rotation of the planetary gears, said means including levers mounted between their ends on the crank pins and members connecting the arms of the levers.

11. In a flexible power transmitting mechanism, the combination of driving and driven elements, a gear mounted on one element, a planetary gear carried by the other element and meshing with the former gear, the planetary gear having a crank pin associated therewith, spring means connected to the crank pin to resist rotation of the planetary gear, said means including a lever mounted between its ends on the crank pin, and members connected to the opposite ends of the lever to resist movement of the lever with the crank pin.

In testimony whereof, I have hereunto signed my name at Syracuse, in the county of Onondaga, and State of New York, this 3rd day of May, 1924.

JOHN B. WEST.